(12) United States Patent
Xie et al.

(10) Patent No.: US 10,139,965 B2
(45) Date of Patent: Nov. 27, 2018

(54) TOUCH PANEL, MANUFACTURING METHOD THEREOF AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Xiaodong Xie, Beijing (CN); Ming Hu, Beijing (CN); Hongqiang Luo, Beijing (CN); Ming Zhang, Beijing (CN); Xianlin Ding, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 406 days.

(21) Appl. No.: 14/786,358

(22) PCT Filed: Jun. 19, 2015

(86) PCT No.: PCT/CN2015/081987
§ 371 (c)(1),
(2) Date: Oct. 22, 2015

(87) PCT Pub. No.: WO2016/086648
PCT Pub. Date: Jun. 9, 2016

(65) Prior Publication Data
US 2016/0162072 A1    Jun. 9, 2016

(30) Foreign Application Priority Data

Dec. 5, 2014 (CN) .......................... 2014 1 0734798

(51) Int. Cl.
| | | |
|---|---|---|
| *G06F 3/041* | (2006.01) | |
| *G06F 3/044* | (2006.01) | |
| *G06F 3/047* | (2006.01) | |

(52) U.S. Cl.
CPC .............. *G06F 3/044* (2013.01); *G06F 3/047* (2013.01); *G06F 3/0412* (2013.01);
(Continued)

(58) Field of Classification Search
CPC ................... G06F 3/044; G06F 3/0412; G06F 2203/04103; G06F 3/041;
(Continued)

(56) References Cited

U.S. PATENT DOCUMENTS

2007/0262962 A1    11/2007  XiaoPing et al.
2014/0168540 A1*   6/2014   Wang .................... G06F 3/0412
                                                              349/12
(Continued)

FOREIGN PATENT DOCUMENTS

CN    201403089 Y    2/2010
CN    103049155 A    4/2013
(Continued)

OTHER PUBLICATIONS

Firstt Chinese Office Action dated Dec. 28, 2016; Appln. No. 201410734798.2.
(Continued)

*Primary Examiner* — Duc Q Dinh
(74) *Attorney, Agent, or Firm* — Ladas & Parry LLP (57) ABSTRACT

A touch panel, a manufacturing method thereof and a display device are disclosed. The touch panel includes a first sensing layer (10) and a second sensing layer (11) which are superimposed. The first sensing layer includes a plurality of columns of first sensing lines (12); each first sensing line is formed by the alternate series connection between first
(Continued)

transparent electrodes (1) and first metal wires (2); the second sensing layer includes a plurality of rows of second sensing lines (34); each second sensing line is formed by the alternate series connection between second transparent electrodes (3) and second metal wires (4); in terms of vertical projections of the first sensing layer and the second sensing layer on a plane of the touch panel, the first transparent electrodes (1) and the second transparent electrodes (3) are alternately arranged along the column direction and the row direction; the first metal wires (2) and the second metal wires (4) are alternately arranged along the column direction and the row direction; the first metal wire (2) crosses over the second transparent electrode (3); and the second metal wire (4) crosses over the first transparent electrode (1). The touch panel can solve the Moiré problem.

20 Claims, 5 Drawing Sheets

(52) U.S. Cl.
CPC .. *G06F 3/0418* (2013.01); *G06F 2203/04103* (2013.01); *G06F 2203/04111* (2013.01)

(58) Field of Classification Search
CPC .. G06F 2203/04111; G06F 2203/04112; G06F 3/047; G06F 1/16; G02F 1/13338; G02F 1/13439; G02F 1/136286; G02F 1/134363; G02F 1/134309; G02F 1/133512; G02F 1/1345; G02F 2001/13629; G02F 1/1343
USPC .................................................. 345/173–175
See application file for complete search history.

(56) References Cited

U.S. PATENT DOCUMENTS

| | | | |
|---|---|---|---|
| 2014/0253825 A1 | 9/2014 | He | |
| 2015/0331508 A1* | 11/2015 | Nho | ................... G06F 3/0421 345/173 |

FOREIGN PATENT DOCUMENTS

| CN | 103176681 A | 6/2013 |
|---|---|---|
| CN | 103278955 A | 9/2013 |
| CN | 203338323 A | 12/2013 |
| CN | 104407759 A | 3/2015 |
| CN | 204215394 U | 3/2015 |

OTHER PUBLICATIONS

International Search Report and Written Opinion both dated Aug. 28, 2015; PCT/CN2015/081987.

* cited by examiner

TOUCH PANEL, MANUFACTURING METHOD THEREOF AND DISPLAY DEVICE

TECHNICAL FIELD

Embodiments of the present disclosure relate to a touch panel, a manufacturing method thereof and a display device.

BACKGROUND

In the touch panel industry, the means of using metal meshes as touch driving lines and touch sensing lines is widely applied. Compared with indium tin oxide (ITO), the metal mesh has become attractive in research for those skilled in the related art due to rapid signal transmission speed. But there are many problems in the application of the metal meshes in touch panels, and particularly, the Moiré problem is the most difficult to solve.

The Moiré problem is usually solved by reducing the line width of metal wires. But the reduction of the line width of the metal wires will result in the increase of the manufacturing difficulty and the manufacturing cost. Moreover, when the line width of the metal wires is reduced to be very low, the problems such as breakage of the metal wires and poor electrostatic breakdown resistance can be easily caused.

SUMMARY

Embodiments of the present disclosure provide a touch panel, a manufacturing method thereof and a display device, which not only can solve the Moiré problem but also cannot result in the problems such as increase of the manufacturing difficulty and manufacturing cost, breakage of metal wires and poor electrostatic breakdown resistance.

An embodiment of the present disclosure provides a touch panel, which comprises: a first sensing layer, in which the first sensing layer includes a plurality of columns of first sensing lines, and each first sensing line is formed by alternate series connection between first transparent electrodes and first metal wires; and a second sensing layer superimposed on the first sensing layer, in which the second sensing layer includes a plurality of rows of second sensing lines, and each second sensing line is formed by alternate series connection between second transparent electrodes and second metal wires, wherein in terms of vertical projections of the first sensing layer and the second sensing layer on a plane of the touch panel, the first transparent electrodes of the first sensing layer and the second transparent electrodes of the second sensing layer are alternately arranged along a column direction and a row direction; the first metal wires of the first sensing layer and the second metal wires of the second sensing layer are alternately arranged along the column direction and the row direction; the first metal wires of the first sensing layer cross over the second transparent electrodes of the second sensing layer; and the second metal wires of the second sensing layer cross over the first transparent electrodes of the first sensing layer.

For instance, in the touch panel, both a width of the first metal wire and a width of the second metal wire are 5 to 8 μm.

For instance, in the touch panel, a first metal electrode is formed in a middle of the first metal wire which is electrically connected with the first metal electrode.

For instance, in the touch panel, the first metal electrode is a metal electrode line perpendicular to the extension direction of the first metal wire; or the first metal electrode is a diamond frame formed by a metal electrode line; or the first metal electrode is a circular frame formed by a metal electrode line.

For instance, in the touch panel, a second metal electrode is formed in a middle of the second metal wire which is electrically connected with the second metal electrode.

For instance, in the touch panel, the second metal electrode is a metal electrode line perpendicular to the extension direction of the second metal wire; or the second metal electrode is a diamond frame formed by a metal electrode line; or the second metal electrode is a circular frame formed by a metal electrode line.

For instance, the touch panel further comprises: a substrate on which the first sensing layer and the second sensing layer are superimposed; and a black matrix disposed between the substrate and one of the first sensing layer and the second sensing layer, closer to the substrate, in which vertical projection of the black matrix on the plane of the touch panel covers vertical projections of the first metal wires and the second metal wires on the plane of the touch panel.

For instance, the touch panel further comprises an insulating layer disposed between the first sensing layer and the second sensing layer.

An embodiment of the present disclosure further provides a method for manufacturing a touch panel, which are used for manufacturing any of the touch panels, and the manufacturing method comprises: forming a first sensing layer on a substrate, in which the first sensing layer includes a plurality of columns of first sensing lines, and each first sensing line is formed by alternate series connection between first transparent electrodes and first metal wires; and forming a second sensing layer on the substrate, in which the second sensing layer is superimposed on the first sensing layer and includes a plurality of rows of second sensing lines, and each second sensing line is formed by alternate series connection between second transparent electrodes and second metal wires; in terms of vertical projections of the first sensing layer and the second sensing layer on a plane of the touch panel, the first transparent electrodes of the first sensing layer and the second transparent electrodes of the second sensing layer are alternately arranged along the column direction and the row direction; the first metal wires of the first sensing layer and the second metal wires of the second sensing layer are alternately arranged along the column direction and the row direction; the first metal wires of the first sensing layer cross over the second transparent electrodes of the second sensing layer; and the second metal wires of the second sensing layer cross over the first transparent electrodes of the first sensing layer.

For instance, in the method for manufacturing the touch panel, forming the first sensing layer on the substrate includes: forming patterns of the first transparent electrodes of the first sensing layer by a photolithography process; and forming patterns of the first metal wires of the first sensing layer by a photolithography process, in which forming of the first transparent electrodes of the first sensing layer and forming of the first metal wires of the first sensing layer are not limited in sequence.

For instance, in the method for manufacturing the touch panel, forming the second sensing layer on the substrate includes: forming patterns of the second transparent electrodes of the second sensing layer by a photolithography process; and forming patterns of the second metal wires of the second sensing layer by a photolithography process, in which forming of the second transparent electrodes of the second sensing layer and forming of the second metal wires of the second sensing layer are limited in sequence.

For instance, in the method for manufacturing the touch panel, before forming the first sensing layer and the second sensing layer, the method further comprises: forming patterns of a black matrix on the substrate by a photolithography process, in which vertical projection of the black matrix on a plane of the touch panel covers vertical projections of the first metal wires and the second metal wires on the plane of the touch panel.

For instance, the method for manufacturing the touch panel further comprises forming an insulating layer, wherein the insulating layer is disposed between the first sensing layer and the second sensing layer.

An embodiment of the present disclosure further provides a display device, which comprises any foregoing touch panel.

BRIEF DESCRIPTION OF THE DRAWINGS

Simple description will be given below to the accompanying drawings of the embodiments to provide a more clear understanding of the technical proposals of the embodiments of the present disclosure. Obviously, the drawings described below only involve some embodiments of the present disclosure but are not intended to limit the present disclosure.

DETAILED DESCRIPTION

For more clear understanding of the objectives, technical proposals and advantages of the embodiments of the present disclosure, clear and complete description will be given below to the technical proposals of the embodiments of the present disclosure with reference to the accompanying drawings of the embodiments of the present disclosure. Obviously, the preferred embodiments are only partial embodiments of the present disclosure but not all the embodiments. All the other embodiments obtained by those skilled in the art without creative efforts on the basis of the embodiments of the present disclosure illustrated shall fall within the scope of protection of the present disclosure.

Unless otherwise specified, the technical terms or scientific terms used herein shall have normal meanings understood by those skilled in the art. The words "first", "second" and the like used in the disclosure do not indicate the sequence, the number or the importance but are only used for distinguishing different components.

Detailed description will be given below to the touch panel and the manufacturing method thereof, provided by embodiments of the present disclosure, with reference to the accompanying drawings.

An embodiment of the present disclosure provides a touch panel, which, as illustrated in FIGS. 1 to 4, comprises a first sensing layer 10; the first sensing layer 10 includes a plurality of columns of first sensing lines 12, and each first sensing line 12 is formed by the alternate series connection between first transparent electrodes 1 and first metal wires 2; and the touch panel comprises a second sensing layer 11 superimposed on the first sensing layer 10, and the second sensing layer 11 includes a plurality of rows of second sensing lines 34, and each second sensing line 34 is formed by the alternate series connection between second transparent electrodes 3 and second metal wires 4. In terms of the vertical projections of the first sensing layer 10 and the second sensing layer 11 on a plane of the touch panel, the first transparent electrodes 1 of the first sensing layer and the second transparent electrodes 3 of the second sensing layer are alternately arranged along both the column direction and the row direction; the first metal wires 2 of the first sensing layer and the second metal wires 4 of the second sensing layer are alternately arranged along both the column direction and the row direction; the first metal wires 2 of the first sensing layer cross over the second transparent electrodes 3 of the second sensing layer; and the second metal wires 4 of the second sensing layer cross over the first transparent electrodes 1 of the first sensing layer.

Figure 1:
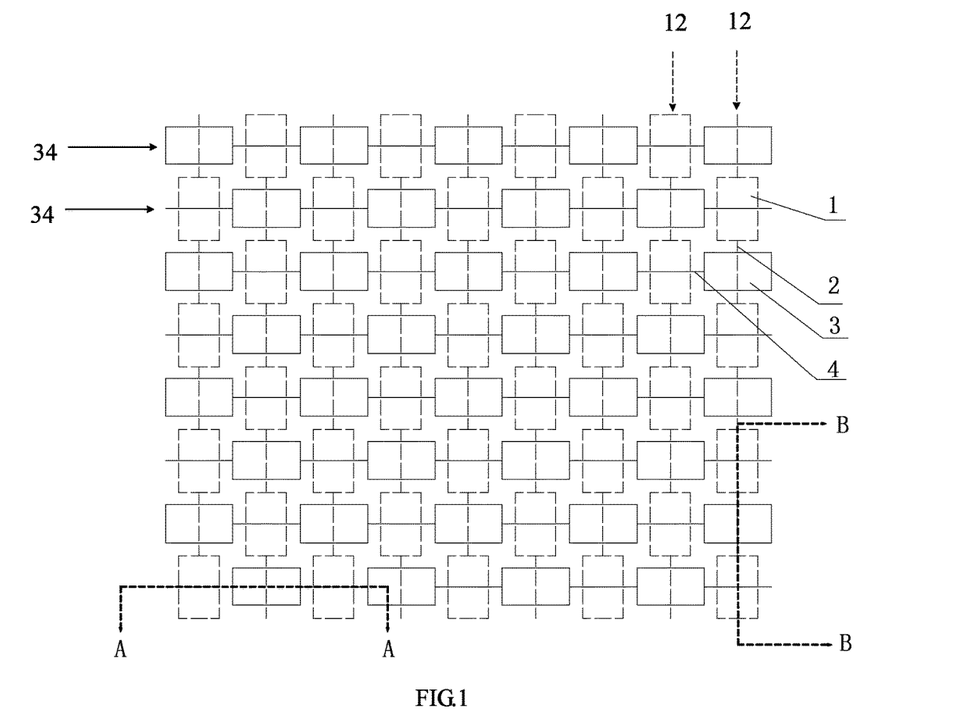
FIG. 1 is a plan view of a touch panel provided by an embodiment of the present disclosure.
Figure 2:
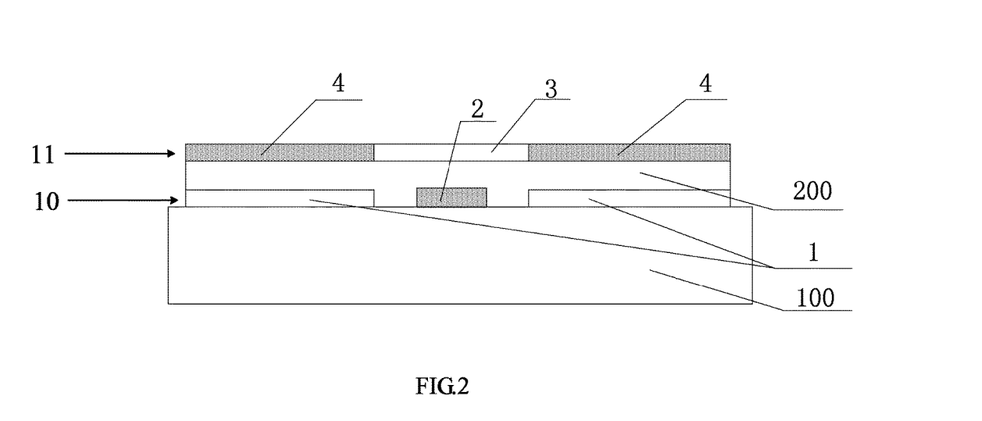
FIG. 2 is a schematic enlarged view of a cross section along line A-A in FIG. 1.
Figure 3:
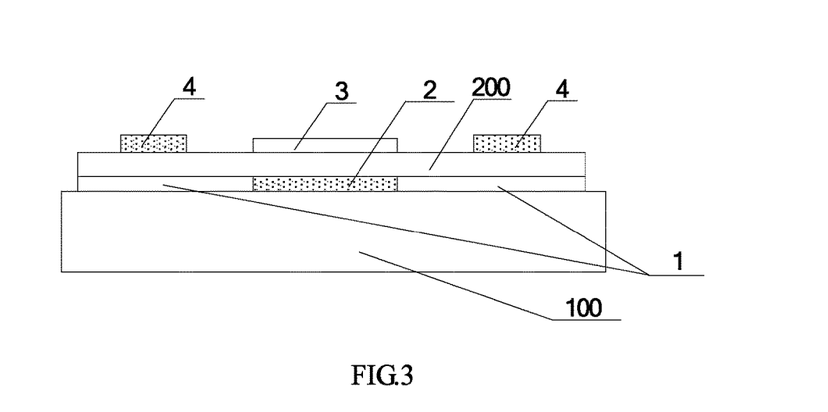
FIG. 3 is a schematic enlarged view of a cross section along line B-B in FIG. 1.

In the touch panel provided by the embodiment of the present disclosure, as illustrated in FIG. 1, each first sensing line includes a plurality of first transparent electrodes 1 and a plurality of first metal wires 2; and each second sensing line includes a plurality of second transparent electrodes 3 and a plurality of second metal wires 4.

In the touch panel provided by the embodiment of the present disclosure, mutual capacitance is produced between the first metal wires 2 of the first sensing layer and the second transparent electrodes 3 of the second sensing layer and also between the first transparent electrodes 1 of the first sensing layer and the second metal wires 4 of the second sensing layer upon touch sensing, so that touch control can be achieved.

In the embodiment of the present disclosure, the sensing line of the sensing layer of the touch panel is not of an entire metal wire but converted to a structure formed by the alternate series connection between metal wires and transparent electrodes, so that the density of the metal wires can be obviously reduced and the metal wires are arranged in an irregular arrangement mode, and hence the Moiré phenomenon can be eliminated. Meanwhile, because the Moiré phenomenon in the embodiment of the present disclosure is eliminated by the alternated connection between the transparent electrodes and the metal wires, the line width of the metal wires is not required to be reduced to eliminate the Moiré phenomenon. Therefore, the manufacturing difficulty and the manufacturing cost of the metal wires can be reduced; and the metal wires can have sufficient strength, may not be easily broken and cannot be easily subjected to electrostatic breakdown.

In the embodiment of the present disclosure, the metal wires include the first metal wires 2 and/or the second metal wires 4; and the transparent electrodes include the first transparent electrodes 1 and/or the second transparent electrodes 3.

Figure 4:
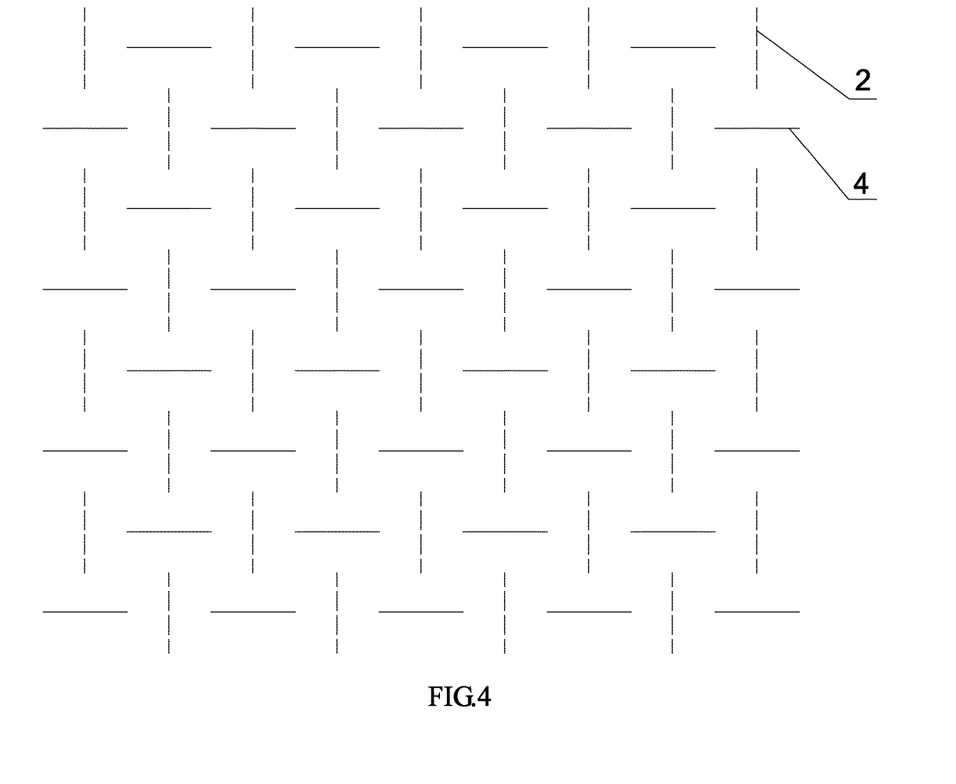
FIG. 4 is a plan view of metal wires of the touch panel provided by an embodiment of the present disclosure.

FIG. 4 illustrate a pattern of the touch panel in which the transparent electrodes are hidden and only the metal wires are left, and horizontal metal wires and vertical metal wires are arranged in different layers. As can be seen from the figure, after the first transparent electrodes 1 and the second transparent electrodes 3 are introduced, the density of the first metal wires 2 and the second metal wires 4 can be obviously reduced, and the first metal wires 2 and the second metal wires are alternately arranged.

For instance, in the embodiment of the present disclosure, the width of the metal wire may be 5 to 8 μm, so that the metal wire can have sufficient strength and avoid breakage and electrostatic breakdown.

In addition, compared with the mode of uniform metal meshes, in the embodiment of the present disclosure, part of the metal wires are replaced by transparent electrodes. As the transparent electrodes have good optical transmittance, in the embodiment, the introduction of the transparent electrodes can also increase the optical transmittance of the touch panel.

Compared with the pattern of uniform transparent electrodes, the design of the embodiment can also increase the signal transmission speed and reduce the resistor-capacitor delay (RC Delay) value and hence increase the touch sensitivity of the touch panel.

It should be noted that the first sensing layer (or the second sensing layer) may be a layer closer to the substrate and may also be a layer farther away from the substrate. Description is given in the embodiment of the present disclosure by taking the case that the first sensing layer is taken as the layer closer to the substrate and the second sensing layer is taken as the layer farther away from the substrate as an example.

Moreover, a first metal electrode 5 may be disposed in the middle of a first metal wire 2; a second metal electrode 6 may be disposed in the middle of a second metal wire 4; the first metal wire 2 is electrically connected with the first metal electrode 5; and the second metal wire 4 is electrically connected with the second metal electrode 6. The first metal electrode 5 can increase the area of the mutual capacitance between the first metal wire 2 and the second transparent electrode 3 in different layers, and the second metal electrode 6 can increase the area of the mutual capacitance between the second metal wire 4 and the first transparent electrode 1 in different layers. Therefore, the mutual capacitance can be increased, and hence the sensitivity of the touch panel can be improved.

Figure 5:
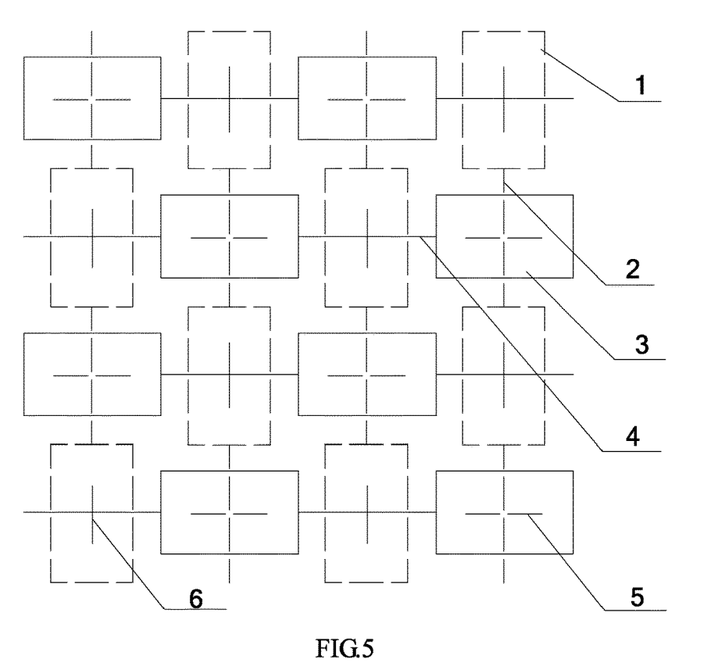
FIG. 5 is a schematic diagram of a touch panel, provided with metal electrodes of a first structure provided by an embodiment of the present disclosure.

As illustrated in FIG. 5, the first metal electrode 5 may be a metal electrode line perpendicular to the extension direction of the first metal wire; the second metal electrode 6 may be a metal electrode line perpendicular to the extension direction of the second metal wire; and the length of the metal electrode line is defined so that the metal electrode line is only electrically connected with the metal wire connected therewith and not electrically connected with other metal wires. For instance, the length of the metal electrode line may not exceed the length of the transparent electrode corresponding to the metal electrode line. The metal electrode line perpendicular to the extension direction of the first metal wire 2 is disposed on the first metal wire 2 to form a crossed pattern with the first metal wire 2, and the metal electrode line perpendicular to the extension direction of the second metal wire 4 is disposed on the second metal wire 4 to form a crossed pattern with the second metal wire 4. Therefore, the mutual capacitance between the first sensing layer and the second sensing layer can be increased, and hence the touch sensitivity can be further improved.

Figure 6:
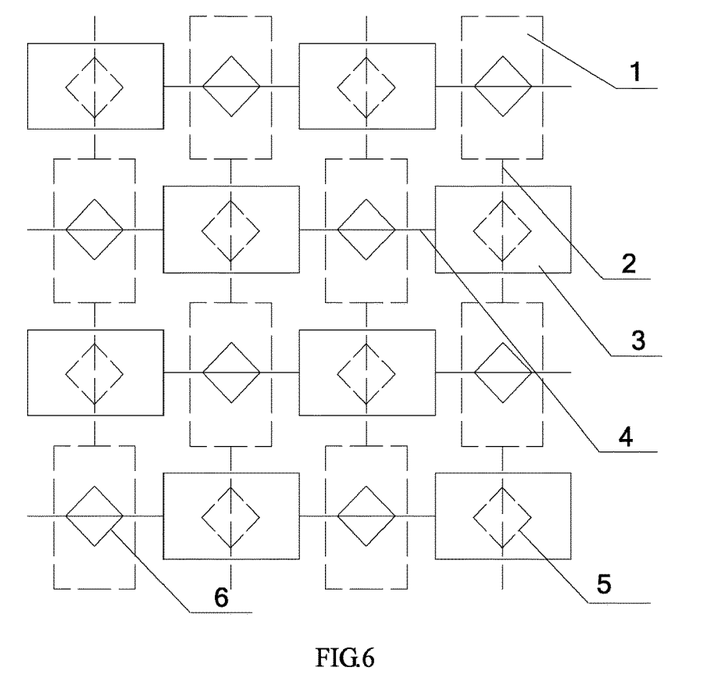
FIG. 6 is a schematic diagram of a touch panel, provided with metal electrodes of a second structure provided by an embodiment of the present disclosure.

Or as illustrated in FIG. 6, the first metal electrode and the second metal electrode may be a diamond frame formed by a metal electrode line so as to increase mutual capacitance.

Figure 7:
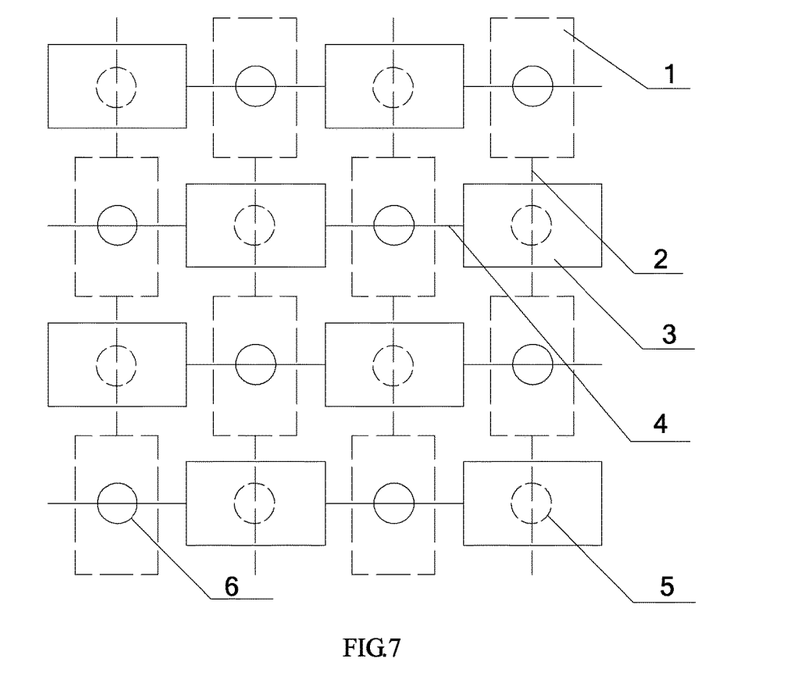
FIG. 7 is a schematic diagram of a touch panel, provided with metal electrodes of a third structure provided by an embodiment of the present disclosure.

Or as illustrated in FIG. 7, the first metal electrode and the second metal electrode may be a circular frame formed by a metal electrode line, so as to increase the mutual capacitance.

Of course, the first metal electrode and the second metal electrode may also be patterns of any other shape, as long as the relative area between an upper plate and a lower plate can be increased, the mutual capacitance can be increased and the objective of further improving the touch sensitivity can be achieved.

In the embodiment, the first transparent electrodes 1 and the second transparent electrodes 3 are usually made from indium tin oxide (ITO).

Figure 8:
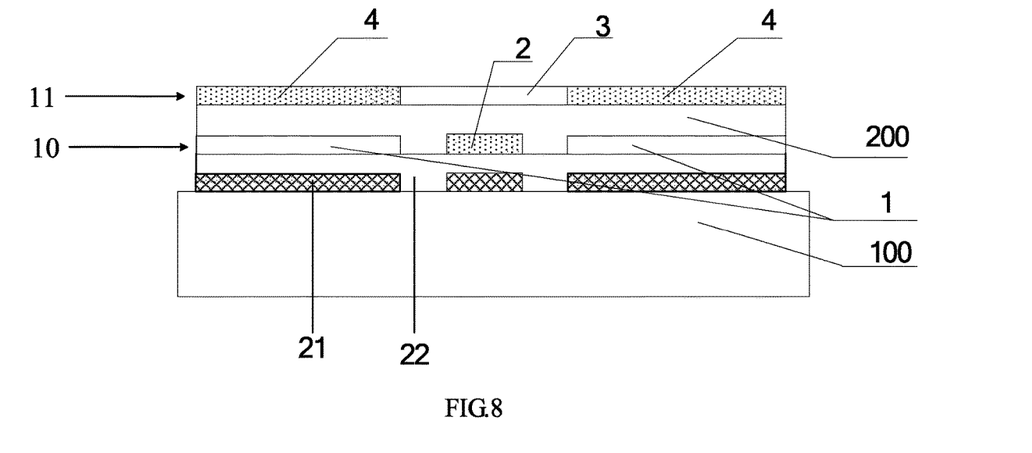
FIG. 8 is a schematic enlarged view of a cross section of the touch panel along line A-A in FIG. 1 provided by an embodiment of the present disclosure in the case that black matrix are arranged.
Figure 9:
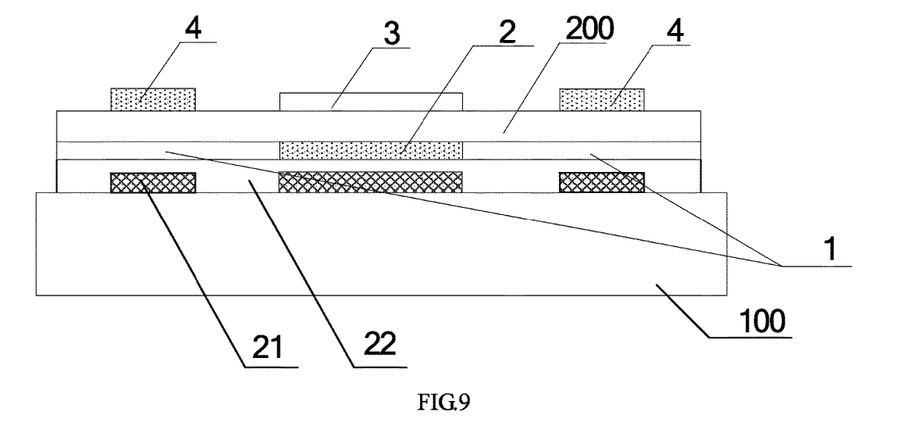
FIG. 9 is a schematic enlarged view of a cross section of the touch panel along line B-B in FIG. 1 provided by an embodiment of the present disclosure in the case where a black matrix is arranged.

In general, the touch panel further comprises: a substrate 100 on which the first sensing layer and the second sensing layer are superimposed; and black matrix 21 disposed between the substrate 100 and one of the first sensing layer and the second sensing layer, closer to the substrate 100, in which the vertical projection of the black matrix on a plane of the touch panel covers the vertical projections of the first metal wires and the second metal wires on the plane of the touch panel, so that the black matrix can be configured to shield the metal wires, and hence the light leakage at the metal wires can be avoided. For instance, the example may be as shown in FIGS. 8 and 9. For instance, a planarization layer or an insulating layer 22 may also be disposed between the black matrix 21 and one of the first sensing layer and the second sensing layer, closer to the substrate 100.

The touch panel may further comprise: an insulating layer 200 disposed between the first sensing layer and the second sensing layer, so as to have the function of insulating the first sensing layer and the second sensing layer. The insulating layer 200 may be made from optical cement (OC).

Corresponding to the foregoing touch panel, the embodiment of the present disclosure provides a method for manufacturing a touch panel, which is used for manufacturing the foregoing touch panel. The manufacturing method comprises the following steps.

A first sensing layer is formed on a substrate 100, the first sensing layer includes a plurality of columns of first sensing lines, and each first sensing line is formed by the alternate series connection between first transparent electrodes 1 and first metal wires 2.

A second sensing layer is formed on the substrate 100, the second sensing layer is superimposed on the first sensing layer and includes a plurality of rows of second sensing lines, and each second sensing line is formed by the alternate series connection between second transparent electrodes 3 and second metal wires 4; in terms of the vertical projections of the first sensing layer and the second sensing layer on a plane of the touch panel, the first transparent electrodes 1 of the first sensing layer and the second transparent electrodes 3 of the second sensing layer are alternately arranged along both the column direction and the row direction; the first metal wires 2 of the first sensing layer and the second metal wires 4 of the second sensing layer are alternately arranged along both the column direction and the row direction; the first metal wires 2 of the first sensing layer cross over the second transparent electrodes 3 of the second sensing layer;

and the second metal wires 4 of the second sensing layer cross over the first transparent electrodes 1 of the first sensing layer.

In the method for manufacturing the touch panel, the entire metal wire is used again but converted into a structure formed by the alternate series connection between metal wires and transparent electrodes (the first transparent electrodes and the first metal wires are in alternate series connection, and the second transparent electrodes and the second metal wires are in alternate series connection), so that the density of the metal wires (the first metal wires and the second metal wires) can be obviously reduced and the metal wires (the first metal wires and the second metal wires) are alternately, irregularly arranged, and hence the Moiré phenomenon can be eliminated. Meanwhile, the alternated connection between the transparent electrodes and the metal wires (two adjacent first transparent electrodes are connected with each other through a first metal wire, and two adjacent second transparent electrodes are connected with each other through a second metal wire) is adopted to eliminate the Moiré phenomenon, so that the line width of the metal wires is not required to be reduced to eliminate the Moiré phenomenon. Therefore, the manufacturing difficulty and the manufacturing cost of the metal wires can be reduced; and the metal wires can have sufficient strength, cannot be easily broken, and cannot be easily subjected to electrostatic breakdown.

For instance, the step of forming the first sensing layer on the substrate 100 includes: forming patterns of the first transparent electrodes 1 of the first sensing layer by a photolithography process; and forming patterns of the first metal wires 2 of the first sensing layer by a photolithography process, in which forming of the first transparent electrodes 1 of the first sensing layer and forming of the first metal wires 2 of the first sensing layer are limited in sequence. It should be noted that a photolithography process includes processes such as coating, exposure, development, etching, cleaning and so on.

The step of forming the second sensing layer on the substrate 100 includes: forming patterns of the second transparent electrodes 3 of the second sensing layer by a photolithography process; and forming patterns of the second metal wires 4 of the second sensing layer by a photolithography process, in which forming of the second transparent electrodes 3 of the second sensing layer and forming of the second metal wires 4 of the second sensing layer are not limited in sequence.

As the manufactured metal wires can adopt a large line width, in the process of exposure, development and etching for photolithography, the requirements on mask accuracy, alignment accuracy and etching accuracy are reduced, and hence the manufacturing difficulty of the first sensing layer and the second sensing layer can be reduced.

As illustrated in FIGS. 1 to 7, as internal structures of the first sensing layer and the second sensing layer are just perpendicular to each other in extension, in the exposure and development processes, the first sensing layer and the second sensing layer can be formed by a same mask. For instance, if the first sensing layer is formed before the second sensing layer, when the second sensing layer is formed, the mask for the first sensing layer may be rotated for 90 degrees and taken as the mask for the second sensing layer. If the second sensing layer is formed before the first sensing layer, when the first sensing layer is formed, the mask for the second sensing layer may be rotated for 90 degrees and taken as the mask for the first sensing layer. Therefore, the manufacturing cost can be reduced and the manufacturing process can be simplified.

In the embodiment, if the first sensing layer is the layer closer to the substrate and the second sensing layer is the layer farther away from the substrate, peripheral circuits on edge portions of the touch panel can also be formed at the same time when the metal wires of the first sensing layer are formed. In contrast, if the second sensing layer is the layer closer to the substrate and the first sensing layer is the layer farther away from the substrate, peripheral circuits may be formed simultaneously with the metal wires of the second sensing layer. Therefore, the process sequence can be reduced and the production efficiency can be improved.

In general, before the step of forming the first sensing layer and the second sensing layer, the method may further comprise: forming patterns of black matrix on the substrate 100 by a photolithography process, in which the vertical projection of the black matrix on a plane of the touch panel covers the vertical projections of the first metal wires and the second metal wires on the plane of the touch panel, so that the formed black matrix layer can be configured to shield the metal wires.

Before the step of forming the first sensing layer and the second sensing layer, the method may further comprise: forming an insulating layer 200, so that the first sensing layer and the second sensing layer can be kept to be electrically insulated.

It should be noted that: for the convenience of distinguishing, in FIGS. 1 to 7, the first transparent electrodes 1, the first metal wires 2 and the metal electrodes of the first sensing layer are represented by dotted lines, and the second transparent electrodes 3, the second metal wires 4 and the metal electrodes of the second sensing layer are represented by solid lines.

The embodiment of the present disclosure further provides a display device, which comprises any foregoing touch panel.

For instance, the display device may be a display device such as a liquid crystal display (LCD), an E-paper display and an organic light-emitting diode (OLED) display and any product or component with display function, comprising the display device, e.g., TV, digital camera, mobile phone, watch, tablet PC, notebook computer and navigator.

In the touch panel, the manufacturing method thereof and the display device, provided by the embodiment of the present disclosure, both the first sensing layer and the second sensing layer of the touch panel adopt the combined structure of the metal wires and the transparent electrodes; the plurality of sensing lines included are all formed by the alternate series connection between the transparent electrodes and the metal wires; and in the touch sensing of the touch panel, mutual capacitance is produced between the metal wires of the first sensing layer and the transparent electrodes of the second sensing layer of the touch panel and also between the transparent electrodes of the first sensing layer and the metal wires of the second sensing layer, and hence touch control can be achieved. In the embodiment of the present disclosure, the sensing line of the sensing layer of the touch panel is not an entire metal wire but converted to the structure formed by the alternate series connection between the metal wires and the transparent electrodes, so that the density of the metal wires can be obviously reduced and the metal wires are alternately, irregularly arranged, and hence the Moiré phenomenon can be eliminated. Meanwhile, as the Moiré phenomenon in the embodiment of the present disclosure is eliminated by the alternated connection between the transparent electrodes and the metal wires, the line width of the metal wires is not required to be reduced to eliminate the Moiré phenomenon. Therefore, the manufacturing difficulty and the manufacturing cost of the metal wires can be reduced; and the metal wires can have sufficient strength, cannot be easily broken and cannot be easily subjected to electrostatic breakdown.

The foregoing is only the preferred embodiments of the present disclosure and not intended to limit the scope of protection of the present disclosure. Any change or replacement that may be easily thought of by those skilled in the art within the technical scope disclosed by the present disclosure shall fall within the scope of protection of the present disclosure. Therefore, the scope of protection of the present disclosure shall be defined by the appended claims.

The application claims priority of the Chinese patent application No. 201410734798.2, filed on Dec. 5, 2014, the disclosure of which is incorporated herein by reference as part of the application.

The invention claimed is:

1. A touch panel, comprising:
    a first sensing layer, in which the first sensing layer includes a plurality of columns of first sensing lines, and each first sensing line is formed by alternate series connection between first transparent electrodes and first metal wires; and
    a second sensing layer superimposed on the first sensing layer, in which the second sensing layer includes a plurality of rows of second sensing lines, and each second sensing line is formed by alternate series connection between second transparent electrodes and second metal wires, wherein
    in terms of vertical projections of the first sensing layer and the second sensing layer on a plane of the touch panel, the first transparent electrodes of the first sensing layer and the second transparent electrodes of the second sensing layer are alternately arranged along a column direction and a row direction; the first metal wires of the first sensing layer and the second metal wires of the second sensing layer are alternately arranged along the column direction and the row direction; the first metal wires of the first sensing layer cross over the second transparent electrodes of the second sensing layer; and the second metal wires of the second sensing layer cross over the first transparent electrodes of the first sensing layer.

2. The touch panel according to claim 1, wherein both a width of the first metal wire and a width of the second metal wire are 5 to 8 µm.

3. The touch panel according to claim 1, wherein a first metal electrode is formed in a middle of the first metal wire which is electrically connected with the first metal electrode.

4. The touch panel according to claim 3, wherein the first metal electrode is a metal electrode line perpendicular to an extension direction of the first metal wire; or
    the first metal electrode is a diamond frame formed by a metal electrode line; or
    the first metal electrode is a circular frame formed by a metal electrode line.

5. The touch panel according to claim 1, wherein a second metal electrode is formed in a middle of the second metal wire which is electrically connected with the second metal electrode.

6. The touch panel according to claim 5, wherein the second metal electrode is a metal electrode line perpendicular to an extension direction of the second metal wire; or
    the second metal electrode is a diamond frame formed by a metal electrode line; or
    the second metal electrode is a circular frame formed by a metal electrode line.

7. The touch panel according to claim 1, further comprising:
    a substrate on which the first sensing layer and the second sensing layer are superimposed; and
    a black matrix disposed between the substrate and one of the first sensing layer and the second sensing layer, closer to the substrate, in which vertical projection of the black matrix on the plane of the touch panel covers vertical projections of the first metal wires and the second metal wires on the plane of the touch panel.

8. The touch panel according to claim 7, further comprising an insulating layer disposed between the first sensing layer and the second sensing layer.

9. A display device, comprising the touch panel according to claim 1.

10. The touch panel according to claim 3, wherein a second metal electrode is formed in a middle of the second metal wire which is electrically connected with the second metal electrode.

11. The touch panel according to claim 10, wherein the second metal electrode is a metal electrode line perpendicular to an extension direction of the second metal wire; or
    the second metal electrode is a diamond frame formed by a metal electrode line; or
    the second metal electrode is a circular frame formed by a metal electrode line.

12. The touch panel according to claim 3, further comprising:
    a substrate on which the first sensing layer and the second sensing layer are superimposed; and
    a black matrix disposed between the substrate and one of the first sensing layer and the second sensing layer, closer to the substrate, in which vertical projection of the black matrix on the plane of the touch panel covers vertical projections of the first metal wires and the second metal wires on the plane of the touch panel.

13. The touch panel according to claim 12, further comprising an insulating layer disposed between the first sensing layer and the second sensing layer.

14. The touch panel according to claim 5, further comprising:
    a substrate on which the first sensing layer and the second sensing layer are superimposed; and
    a black matrix disposed between the substrate and one of the first sensing layer and the second sensing layer, closer to the substrate, in which vertical projection of the black matrix on the plane of the touch panel covers vertical projections of the first metal wires and the second metal wires on the plane of the touch panel.

15. The touch panel according to claim 14, further comprising an insulating layer disposed between the first sensing layer and the second sensing layer.

16. A method for manufacturing a touch panel, used for manufacturing the touch panel according to claim 1, the manufacturing method comprising:
    forming a first sensing layer on a substrate, in which the first sensing layer includes a plurality of columns of first sensing lines, and each first sensing line is formed by alternate series connection between first transparent electrodes and first metal wires; and
    forming a second sensing layer on the substrate, in which the second sensing layer is superimposed on the first sensing layer and includes a plurality of rows of second sensing lines, and each second sensing line is formed by alternate series connection between second transparent electrodes and second metal wires; in terms of vertical projections of the first sensing layer and the second sensing layer on a plane of the touch panel, the first transparent electrodes of the first sensing layer and the second transparent electrodes of the second sensing layer are alternately arranged along a column direction and a row direction; the first metal wires of the first sensing layer and the second metal wires of the second sensing layer are alternately arranged along the column direction and the row direction; the first metal wires of the first sensing layer cross over the second transparent electrodes of the second sensing layer; and the second metal wires of the second sensing layer cross over the first transparent electrodes of the first sensing layer.

17. The method for manufacturing the touch panel according to claim 16, wherein forming the first sensing layer on the substrate includes:

forming patterns of the first transparent electrodes of the first sensing layer by a photolithography process; and forming patterns of the first metal wires of the first sensing layer by another photolithography process, in which forming of the first transparent electrodes of the first sensing layer and forming of the first metal wires of the first sensing layer are not limited in sequence.

18. The method for manufacturing the touch panel according to claim 16, wherein forming the second sensing layer on the substrate includes:

forming patterns of the second transparent electrodes of the second sensing layer by a photolithography process; and forming patterns of the second metal wires of the second sensing layer by another photolithography process, in which forming of the second transparent electrodes of the second sensing layer and forming of the second metal wires of the second sensing layer are limited in sequence.

19. The method for manufacturing the touch panel according to claim 18, before forming the first sensing layer and the second sensing layer, further comprising:

forming patterns of a black matrix on the substrate by a photolithography process, in which vertical projection of the black matrix on a plane of the touch panel covers vertical projections of the first metal wires and the second metal wires on the plane of the touch panel.

20. The method for manufacturing the touch panel according to claim 19, further comprising forming an insulating layer, wherein the insulating layer is disposed between the first sensing layer and the second sensing layer.

\* \* \* \* \*